(12) United States Patent
Slattery et al.

(10) Patent No.: US 12,210,575 B2
(45) Date of Patent: Jan. 28, 2025

(54) DOCUMENT MANAGEMENT USING CLAUSE CLUSTERS

(71) Applicant: DocuSign, Inc., San Francisco, CA (US)

(72) Inventors: Kenneth Patrick Slattery, Portsmouth, NH (US); James Kenneth Wagner, Jr., Atlanta, GA (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 17/362,664

(22) Filed: Jun. 29, 2021

(65) Prior Publication Data

US 2022/0414153 A1    Dec. 29, 2022

(51) Int. Cl.
| | |
|---|---|
| *G06F 16/906* | (2019.01) |
| *G06F 16/90* | (2019.01) |
| *G06F 16/93* | (2019.01) |
| *G06F 18/214* | (2023.01) |
| *G06F 18/22* | (2023.01) |

(52) U.S. Cl.
CPC .......... *G06F 16/906* (2019.01); *G06F 16/93* (2019.01); *G06F 18/214* (2023.01); *G06F 18/22* (2023.01)

(58) Field of Classification Search
None
See application file for complete search history.

(56) References Cited

U.S. PATENT DOCUMENTS

| | | | |
|---|---|---|---|
| 9,634,975 B2 | 4/2017 | McCabe | |
| 10,430,570 B2 | 10/2019 | Gonser | |
| 10,878,008 B1* | 12/2020 | Cannon | G06Q 10/06315 |
| 2009/0306967 A1* | 12/2009 | Nicolov | G06Q 30/02 704/9 |
| 2012/0079372 A1* | 3/2012 | Kandekar | G06F 40/258 715/256 |
| 2014/0344279 A1* | 11/2014 | Shah | G06F 40/284 707/738 |
| 2020/0193153 A1* | 6/2020 | Lee | G06V 30/414 |

OTHER PUBLICATIONS

Dong Nguyen; How We do Things with Words; Analyzing Text as Social and Cultural Data; frontiers; pp. 1-14 (Year: 2020).*

* cited by examiner

*Primary Examiner* — Albert M Phillips, III
*Assistant Examiner* — Jermaine A Mincey
(74) *Attorney, Agent, or Firm* — KDW Firm PLLC (57) ABSTRACT

A document management system analyzes document clauses using document clause clusters. The document management system uses measures of similarity between document clauses from different documents to assign clauses to clause clusters. Clause clusters may be used to perform various analyses, such as to assign clauses a classification corresponding to a relevant clause cluster. The document management system provides analyses performed using document clause clusters for user review, such as to approve clause clusters, classify clause clusters, modify clause clusters, or some combination thereof.

18 Claims, 5 Drawing Sheets

Document Analytics Dashboard

Search Document Corpus for "Transaction A"

| Search Criteria | Clause Groupings Search Results | Clause Group Documents | Clause Preview |
|---|---|---|---|
| Keywords: [ ] | Limitation of Liability Clause A | AgreeementA.docx | 10. Limitations of Liability |
| Criteria: [ ] | Limitation of Liability Clause B | AgreeementB.docx | 10.1 Limitations and Exclusions. Notwithstanding anything in this agreement or anything else to the contrary, except for any claims subject to (or amounts payable pursuant to) either party's obligations of indemnification under section 11, in no event will either party be liable for any incidental, indirect, special, consequential, or punitive damages (including lost profits, costs of delay, failure of delivery, business interruption, data loss, damage or disclosure, or liabilities to third parties arising from any source), regardless of the nature of the claim, even if such a party has been advised of the possibility of such damages. In any event (but without limiting any amounts rightfully owed by customer to Northwind Incorporated pursuant to the terms of this agreement that have not yet been paid), except for any claims subject to (or amounts payable pursuant to) either party's obligations of indemnification under section 11, the cumulative, aggregate liability of each party for any and all claims arising from or relating to this agreement, whether in contract, tort, strict liability, or any other legal theory, shall not exceed the total amount of fees paid to Northwind Incorporated by customer under the applicable order or sow related to the claim during the twelve (12) months |
| Clause Types: [ ] | Statute of Limitations Clause A | AgreeementC.docx | |
| [+] | Indemnification Clause A | AgreeementD.docx | |
| | Non-Waiver Clause A | AgreeementE.docx | |
| | Arbitration Clause A | AgreeementF.docx | |
| [ Search ] | Non-disclosure Clause A | AgreeementG.docx | |
| | Merger Clause A | AgreeementH.docx | |
| | Unclassified Clause A | AgreeementI.docx | |
| | Unclassified Clause B | AgreeementJ.docx | |

[ Modify ]

Search Criteria Pane 310

Clause Clusters Pane 320

Cluster Documents Pane 330

Clause Preview Pane 340

FIG. 3

Document Analytics Dashboard

Review Unclassified Document Clauses

| Unclassified Clause Cluster A | Unclassified Clause A | Template Clause |
|---|---|---|
| AgreeementA.docx Clause<br>AgreeementB.docx Clause<br>AgreeementC.docx Clause<br>AgreeementD.docx Clause<br>AgreeementE.docx Clause<br>AgreeementF.docx Clause<br>AgreeementG.docx Clause<br>AgreeementH.docx Clause<br>AgreeementI.docx Clause<br>AgreeementJ.docx Clause | 10. Limitations of Liability<br>10.1 Limitations and Exclusions. Notwithstanding anything in this agreement or anything else to the contrary, except for any claims subject to (or amounts payable pursuant to) either party's obligations of indemnification under section 11, in no event will either party be liable for any incidental, indirect, special, consequential, or punitive damages (including lost profits, costs of delay, failure of delivery, business interruption, data loss, damage or disclosure, or liabilities to third parties arising from any source), regardless of the nature of the claim, even if such a party has been advised of the possibility of such damages. In any event (but without limiting any amounts rightfully owed by customer to Northwind Incorporated pursuant to the terms of this agreement that have not yet been paid), except for any claims subject to (or amounts payable pursuant to) either party's obligations of indemnification under section 11, the cumulative, aggregate liability of each party for any and all claims arising from or relating to this agreement, whether in contract, tort, strict liability, or any other legal theory, shall not exceed the total amount of fees paid to Northwind Incorporated by customer under the applicable order or sow related to the claim during the twelve (12) months | 10. Limitations of Liability<br>10.1 Limitations and Exclusions. Notwithstanding anything in this agreement or anything else to the contrary, except for any claims subject to (or amounts payable pursuant to) either party's obligations of indemnification under section 11, in no event will either party be liable for any incidental, indirect, special, consequential, or punitive damages (including lost profits, costs of delay, failure of delivery, business interruption, data loss, damage or disclosure, or liabilities to third parties arising from any source), regardless of the nature of the claim, even if such a party has been advised of the possibility of such damages. In any event, except for any claims subject to either party's obligations of indemnification under section 11, the cumulative, aggregate liability of each party for any and all claims arising from or relating to this agreement, whether in contract, tort, strict liability, or any other legal theory, shall not exceed the total amount of fees paid to Northwind Incorporated by customer under the applicable order or sow related to the claim during the twelve (12) months |

Previous | Next
Approve Cluster | Provide Classification
Reject Cluster | Modify Cluster Review Controls 420
Cluster Documents Pane 410
Selected Clause Pane 430
Cluster Template Clause Pane 440

DOCUMENT MANAGEMENT USING CLAUSE CLUSTERS

TECHNICAL FIELD

The disclosure generally relates to the field of document processing, and specifically to analyzing relationships between document clauses in a document management platform.

BACKGROUND

An entity may provide or create documents for analysis within an online document management system. Conventional document analysis environments provide analysis and perform comparisons of individual documents, but do not provide intelligent analyses of document clauses. To provide an improved, efficient, and more reliable document analysis experience to the user, there is a need for a system that analyzes content based on characteristics of document clauses, and provides recommendations to users of the document analysis environment based on this analysis.

SUMMARY

A document management system analyzes document clauses using document clause clusters. The document management system uses measures of similarity between document clauses from different documents to assign clauses to clause clusters. Clause clusters may be used to perform various analyses, such as to assign clauses a classification corresponding to a relevant clause cluster. The document management system provides analyses performed using document clause clusters for user review, such as to approve clause clusters, classify clause clusters, modify clause clusters, or some combination thereof.

In some embodiments, the document management system accesses a plurality of documents each including a plurality of clauses. The document management system compares the plurality of clauses included in the plurality of documents to a plurality of clusters of clauses, each cluster of clauses including clauses having a shared classification. Based on the comparison of the plurality of clauses to the plurality of clusters of clauses, the document management system identifies a set of clauses from the plurality of clauses that cannot be clustered with at least one of the plurality of clusters, each clause in the set of clauses within a threshold similarity measure to each other clause in the set of clauses. The document management system provides an interface for display to a client device including a clause from the set of clauses. Based on a user input received via the interface, the document management system determines a classification of the clause from the set of clauses. The document management system applies the determined classification to each clause in the set of clauses. Using the set of clauses having the applied classification, the document management system generates a new cluster in the plurality of clusters.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates an example system environment in which document clauses can be analyzed, according to some embodiments.

FIG. 3 illustrates a review interface of a document analytics dashboard for providing a classification for a clause cluster, according to some embodiments.

FIG. 4 illustrates a review interface of a document analytics dashboard for providing a classification for a clause cluster, according to some embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Document Execution Environment Overview

The methods described herein analyze documents to determine clusters of clauses indicative of relationships between document clauses or documents in a document analysis environment. A document management system enables a party (e.g., individuals, organizations, etc.) to create, manage, send, execute, and otherwise interact with documents, e.g., for negotiation, collaborative editing, electronic execution (e.g., electronic signature), automation of contract fulfilment, archival, and analysis. In particular, the document management system may enable a sending party to send a digital document to a receiving party. The receiving party may review content or terms presented in a digital document, and in response to agreeing to the content or terms, can electronically execute the document. In some embodiments, the receiving party provides the sending party (e.g., the party that created and sent the document for execution) with feedback on the content or terms in the document received for execution. In some embodiments, the receiving party completes or contributes to a portion of the content or terms in the document. Additionally, the sending party may access or share data associated with the document within the, such as a time and location at which the receiving party accesses, views, or executes the document. In some embodiments, the receiving or sending parties also have access to archival data of similar documents. In some embodiments, the document management system enables payments between the receiving and sending parties. A document analysis environment and example functionality is further described in U.S. Pat. No. 9,634,875, issued Apr.

25, 2017, and U.S. Pat. No. 10,430,570, issued Oct. 1, 2019, which are hereby incorporated by reference in their entireties.

The system environment described herein can be implemented within an online document system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

The processes described herein process documents to determine clusters of document clauses indicative of relationships between document clusters or clauses. The document analysis environment determines clause clusters using various measures of similarity (e.g., a similarity score) between different clauses, as described in greater detail below with reference to the clause clustering module 150. Clause clusters may be used by the document analysis environment for various processes, such as assigning classifications to clause clusters indicating a type of clause included in the cluster. In some embodiments, clause clusters are organized into a hierarchy of parent and child clusters, where parent clusters correspond to higher-level classifications or categories and child clusters correspond to sub-classifications or sub-categories. The document management system further enables review of document clause clusters review by human users (e.g., a party), such as to approve a clause cluster or provide a classification for the clause cluster, as described in greater detail below with reference to FIGS. 1 and 3-4. Thus, the document management system is able to improve automation of the document review process.

Figure 1:
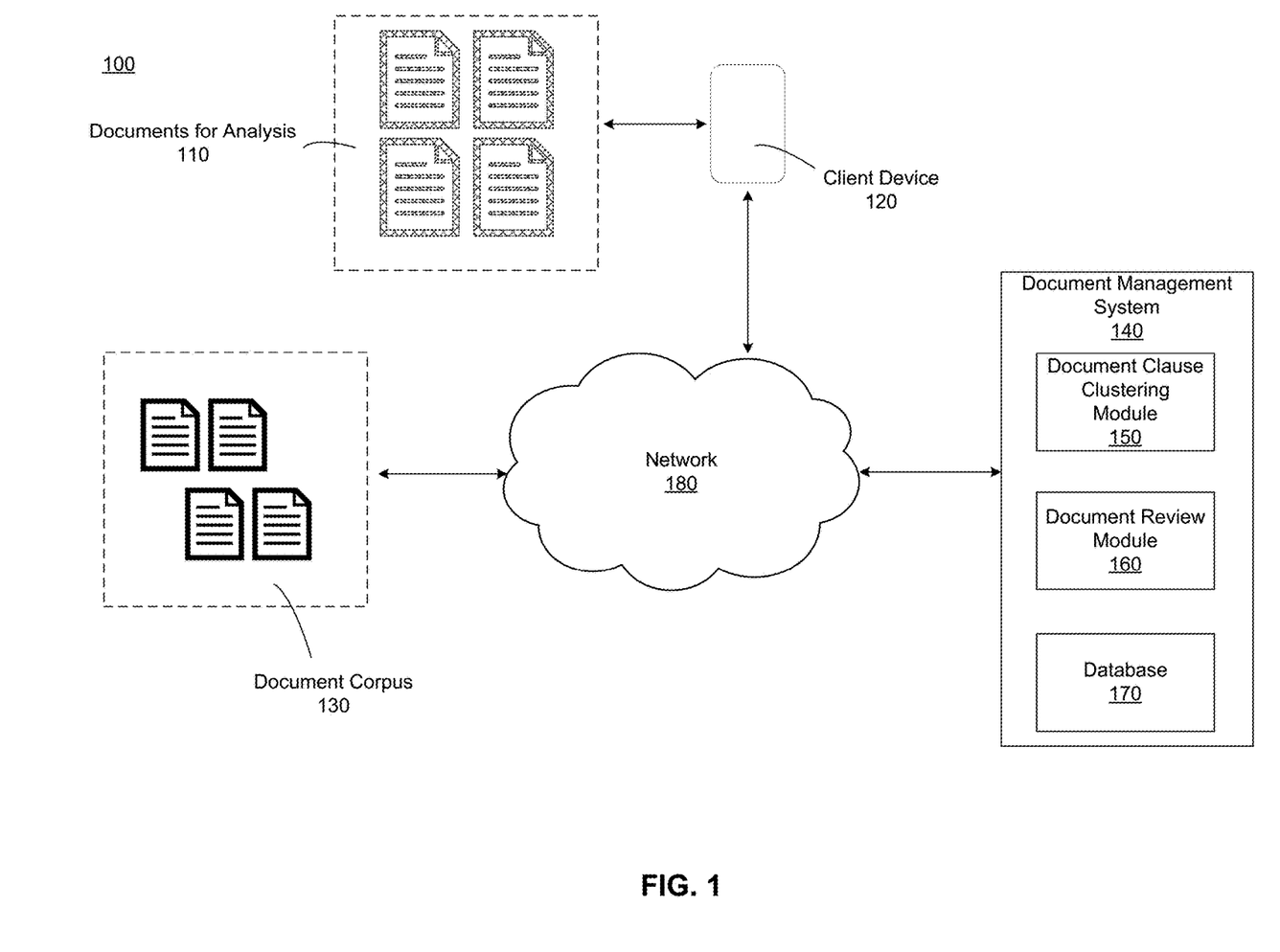

FIG. 1 illustrates an example system environment 100 in which document clauses can be analyzed, in accordance with one or more embodiments. As described above, the system environment 100 enables client systems of the document management system 140 to create and manage digital documents, e.g., for electronic execution to one or more receiving parties. The client systems may review, modify, and execute generated documents. As illustrated in FIG. 1, the system environment 100 includes documents for analysis 110, a client device 120, a set of training documents 130, and a document management system 140, each communicatively interconnected via a network 180. In some embodiments, the system environment 100 includes components other than those described herein. For the purposes of concision, the web servers, data centers, and other components associated with an online system environment are not shown in the embodiment of FIG. 1.

The documents for analysis 110 are analyzed to determine relationships between clauses in the documents for analysis 110 or other documents (e.g., the training documents 130). Each document for execution 110 can include one or more clauses. Examples of documents for analysis 110 include but are not limited to: a sales contract, a permission slip, a rental or lease agreement, a liability waiver, a financial document, an investment term sheet, a purchase order, an employment agreement, a mortgage application, and so on. Each document for execution 110 can include one or more clauses. Clauses are portions of a document, and may include text, images, or other material of any length. In some embodiments, a clause corresponds to a legal clause, a business clause, financial agreement text, and the like. For example, a given document in the documents for analysis 110 may include multiple clauses that each correspond to a different header within the document. Clauses may further be associated with one or more clause types that characterize content of clause as corresponding to a particular category of the clause. Examples of clause types include but are not limited to an indemnity clause, a merger and integration clause, a severability clause, a fees clause, a damages clause, a pricing clause, a purchase clause, a payment clause, and so on. It should be noted that not every portion of a document or of text within a document may be considered a "clause" for the purposes of the description here.

The client device 120 provides the set of documents for analysis 110 to the document management system 140 (or provides instructions to create documents from the client device 120). It should be noted that although examples are given herein in the context of a set of documents for analysis 110, the document management system 140 can coordinate the creation, viewing, editing, analyzing, and signing of any number of documents (e.g., thousands, millions, and more) for any number of users or accounts, and for any number of entities or organizations. The client device 120 is a computing device capable of transmitting or receiving data over the network 180. The client device 120 may be a conventional computer (e.g., a laptop or a desktop computer), a cell phone, or a similar device. The client device 120 enables a user to create or provide the set of documents for analysis 110 to the document management system 140. After the document management system 140 performs a clustering process on the set of documents for analysis 110, the client device 120 may provide information to a user of the client device 120 describing results of the clustering process (e.g., via display of a user interface). In some embodiments, the client device 120 receives an interface for display from the document management system 140 including a cluster of clauses from the set of documents for analysis 110 for review, as described in greater detail below with reference to the document review module 160 and FIGS. 3-4.

The document corpus 130 includes document information for determining clause clusters to compare to clauses of the set of documents for analysis 110. For example, document management system 140 may use the document corpus 130 to generate initial clause clusters that clauses from the set of documents for analysis 110 can be assigned to or otherwise compared to. In some embodiments, the document management system 140 may analyze the set of documents for analysis 110 in isolation or with reference to a particular subset of documents of the document corpus 130. In the same or different embodiments, the document corpus 130 may be used to train one or more machine learning models. The document corpus 130 may include documents provided by one or more parties, such as a party associated with the client device 120. The document corpus 130 may additionally include various information describing documents or clauses of documents (e.g., clause metadata), such as user-provided classifications for clauses.

The document management system 140 is a computer system (or group of computer systems) for storing and managing documents for various entities. In the embodiments shown in FIG. 1, the document management system 140 includes a clause clustering module 150, a document review module 160, and a database 170. In embodiments described herein, the document management system 140 receives information from components of the system environment 100 including the documents for analysis 110 and the document corpus 130. The document management system 140 uses this information received from the system environment 100 to determine clusters of document clauses indicative of relationships between the document clauses or the documents. The document management system 140 further analyzes documents for analysis (e.g., the set of documents for analysis 110) using determined clusters of documents clauses and provides information describing results of such analyses to client devices or systems (e.g., the client device 120).

The document management system 140 can be a server, server group or cluster (including remote servers), or another suitable computing device or system of devices. In some implementations, the document management system 140 can communicate with user devices (e.g., the client device 120) over the network 180 to receive and provide information (e.g., documents or document analyses).

The clause clustering module 150 generates document clause clusters for use in analyzing documents, such as the documents for analysis 110. In some embodiments, the clause clustering module 150 generates clause clusters by comparing an un-clustered clause to one or more clauses within a clause cluster in order to determine a similarity measure (e.g., a similarity score) for the un-clustered clause and the one or more clauses. In this case, the clause clustering module 150 may assign the un-clustered clause to the clause cluster if the similarity measure exceeds a similarity measure threshold, such as over 80% similarity. The similarity measure may be determined using a variety of techniques or metrics, such as exact textual matching, text near duplication, conceptual clustering, conceptual searching, semantics analysis, comparison to a "template" or "primary" clause, term frequency-inverse document frequency (TF-IDF) scoring, or some combination thereof. As used herein, a "template" or "primary" clause is a clause that serves as a model representation of a particular type of clause. For instance, a template clause may serve as a model representation of a "limitation of liability" clause. In cases where template clauses are used, each clause cluster may be associated with one or more template clauses that the clause clustering module 150 compares to un-clustered clauses in order to determine one or more similarity measures.

The clause clustering module 150 may periodically or continuously generates clause clusters as new document data is received (e.g., the documents for analysis 110). In this case, the clause clustering module 150 may compare clauses that cannot be successfully clustered with existing clause clusters in order to generate new clusters, such as clauses that do not have a similarity measure with clauses of any existing clusters that exceed a similarity measure threshold. Clause clustering module 150 may generate a new cluster once a minimum number of clauses that cannot be successfully clustered with existing clusters are clustered together (e.g., five clauses).

In some embodiments, some or all of the existing clauses generated by the clause clustering module 150 may be associated with a classification indicative of a type of clause. In some cases, classifications for clause clusters are determined by the clause clustering module 150, e.g., using natural language processing classification techniques. Alternatively, or additionally, document management system 140 may provide information describing clause clusters without classifications to users for review, e.g., to receive a user-provided classification, approval, or other relevant information. User review of clause clusters is described in greater detail below with reference to document review module 160 and FIGS. 3-4.

In some embodiments, template clauses are identified or provided by users of the document management system 140 (e.g., by the client device 120). For example, users may provide template clauses with a corresponding classification of the template clause to the document management system 140 (e.g., a template "limitation of liability" clause). The document management system 140 may prompt the user to provide or identify template clauses for certain types of clauses. For example, clause clustering module 150 may analyze a corpus of documents for a client system in order to identify a set of clause classes within the corpus of documents, such as by using natural language processing. The document management module 140 may then prompt a user associated with the client system (e.g., via a user interface provided by the document review module 160) to identify template clauses within the corpus of documents corresponding to each of the identified set of clause classes.

In the same or different embodiments, the clause clustering module 150 may processes document clauses in order to identify template clauses. For example, clause clustering module 150 may identify clauses having a similarity measure over a threshold for a threshold number or proportion of clauses. Additionally, or alternatively, the clause clustering module 150 may periodically evaluate determined clause clusters to identify or update template clauses for the clause clusters. For example, the clause clustering module 150 may initially generate a clause cluster with a template clause A and including X clauses. After comparing a set of clauses for analysis (e.g., the clauses for analysis 110) to the template clause A, the clause clustering module 150 may add Y new clauses to the clause cluster for a total of Z clauses. The clause clustering module 150 may evaluate the clause cluster with Z clauses to determine if a different clause than template clause A should be a template clause for the clause cluster, e.g., a clause from the Z clauses that have a similarity score over a threshold for a higher proportion of clauses in the cluster than template clause A. The document management system 140 may further provide information to a corresponding client system indicating that a new template clause has been identified, e.g., to receive approval for the new template clause.

In some embodiments, the clause clustering module 150 determines clause clusters that are broken down into one or more subgroups referred to herein as "stacks." In this case, a clause cluster may include a primary stack of document clauses and one or more secondary stacks of document clauses. A primary stack includes document clauses that are exact or near exact textual matches. Secondary stacks include document clauses that are not exact or near exact textual matches but have a similarity measure above a threshold with clauses in the secondary stack or the primary stack. In cases where a document cluster includes multiple secondary stacks, the secondary stacks may differ based on similarity measure thresholds or based on similarity metrics used to determine a similarity measure. The clause clustering module 150 may automatically assign a classification corresponding to a clause cluster to clauses that are added to a primary stack of the clause cluster. Conversely, the clause clustering module 150 may solicit user input or approval to assign classifications to clauses added to a secondary stack of the clause cluster, such as using one of the processes or interfaces described in greater detail below with reference to the document review module 160 or FIGS. 3-4. In some embodiments, clause clustering module 150 uses stacks to determine template clauses for clause clusters. For example, clauses included in a primary stack may be used as templates. The clause clustering module 150 may further combine multiple sets of stacks to form larger clause clusters.

In some embodiments, the clause clustering module 150 uses terms of contextual significance to determine similarity measures for clauses. As used herein, terms of contextual significance are terms that alter the meaning of a sentence included in a clause relative to if the sentence did not include the term of contextual significance, such as certain legal terms. Example terms of contextual significance include "but," "except," "notwithstanding," "however," "regardless," or any other term that alters the meaning of a sentence in a clause. For instance, an example sentence including terms of contextual significance is "Notwithstanding anything in this agreement or anything else to the contrary, except for any claims subject to (or amounts payable pursuant to) either party's obligations of indemnification under section A, in no event will either party be liable for any incidental, indirect, special, consequential, or punitive damages." Without the inclusions of these terms of contextual significance (e.g., "notwithstanding" and "except"), the phrase "in no event will either party be liable for any incidental, indirect, special, consequential, or punitive damages" has a different meaning than when the terms of contextual significance are included.

The clause clustering module 150 may use terms of contextual significance to determine similarity measures for a first and second clause in various way. For instance, if only one of the first and second clauses includes a term of contextual significance the clause clustering module 150 may determine a similarity measure that is reduced relative to a similarity measure for the first and second clauses where terms of contextual significance are not considered. Conversely, if both the first and second clauses includes a term of contextual significance the clause clustering module 150 may determine a similarity measure that is increased relative to the similarity measure for the first and second clauses where terms of contextual significance are not considered. Furthermore, a similarity measure for the first and second clauses may be over a similarity threshold if terms of contextual significance are not considered in determining the similarity measure, while the similarity measure for the first and second clause may be under the similarity threshold if terms of contextual significance are considered in determining the similarity measure, or vice versa. This discrepancy may be at least in part due to the removal by the clause clustering module of terms of contextual significance from clauses as "stop words" in performing certain analyses, such as in to determining an initial similarity measure for first and second clauses. As such, by particularly accounting for terms of contextual significance in a final determination of a similarity measure the clause clustering module 150 can prevent the loss of important information for document clause analysis. The clause clustering module 150 may use various particular techniques or functions to account for terms of contextual significance in determining a similarity measure for clauses, such as machine learning techniques (e.g., a machine learned similarity measure model that receives clause features describing terms of contextual significance).

The document review module 160 facilitates human review of document analyses. In embodiments, the document review module 160 provides one or more user interfaces to client systems of the document management system 140 for reviewing document analyses (e.g., the client device 120). Document analyses may include results of analyses performed by clause clustering module 150, such as clause clusters determined for the documents for analysis 110. The document review module 160 may further use user input received via the one or more provided user interfaces to update or otherwise modify the document analyses. For example, the document review module 160 may provide user-provided classifications for clause clusters to clause clustering module 150 to associate with relevant clause clusters. Examples user interfaces provided by the document review module 160 are described in greater detail below with reference to FIGS. 3-4.

In some embodiments, the document management system 140 uses clause clusters to determine a commonality measure for different documents or sections of documents. In particular, the document management system 140 may determine similarity measures between individual clauses in a first document and a second document using the techniques described above with reference to the clause clustering module 160. The document management system 140 may use the similarity measures determined for clauses of the first and second documents to determine an overall commonality measure (e.g., a commonality score) for the first and second documents. For instance, a commonality score may indicate a proportion of clauses in the first document having a similarity measure over a threshold with clauses in the second document (e.g., 80% commonality).

The database 170 stores information relevant to the document management system 140. The stored data includes, but is not limited to, the set of documents for analysis 110, clauses within the set of documents for analysis 110, the document corpus 130, clusters of document clauses, and so on. In some embodiments, the database 170 stores metadata information associated with documents or clauses, such as clause classifications. The document management system 140 can update information stored in database 170 as new information n is received or determines, such as new documents for analysis, results of analyses performed by clause clustering module 150, or user input provided via user interfaces of the document review module 160.

The network 180 transmits data within the system environment 100. The network 180 may be a local area or wide area network using wireless or wired communication systems, such as the Internet. In some embodiments, the network 180 transmits data over a single connection (e.g., a data component of a cellular signal, or Wi-Fi, among others), or over multiple connections. The network 180 may include encryption capabilities to ensure the security of customer data. For example, encryption technologies may include secure sockets layers (SSL), transport layer security (TLS), virtual private networks (VPNs), and Internet Protocol security (IPsec), among others.

Generating and Applying Document Clause Clusters

Figure 2:
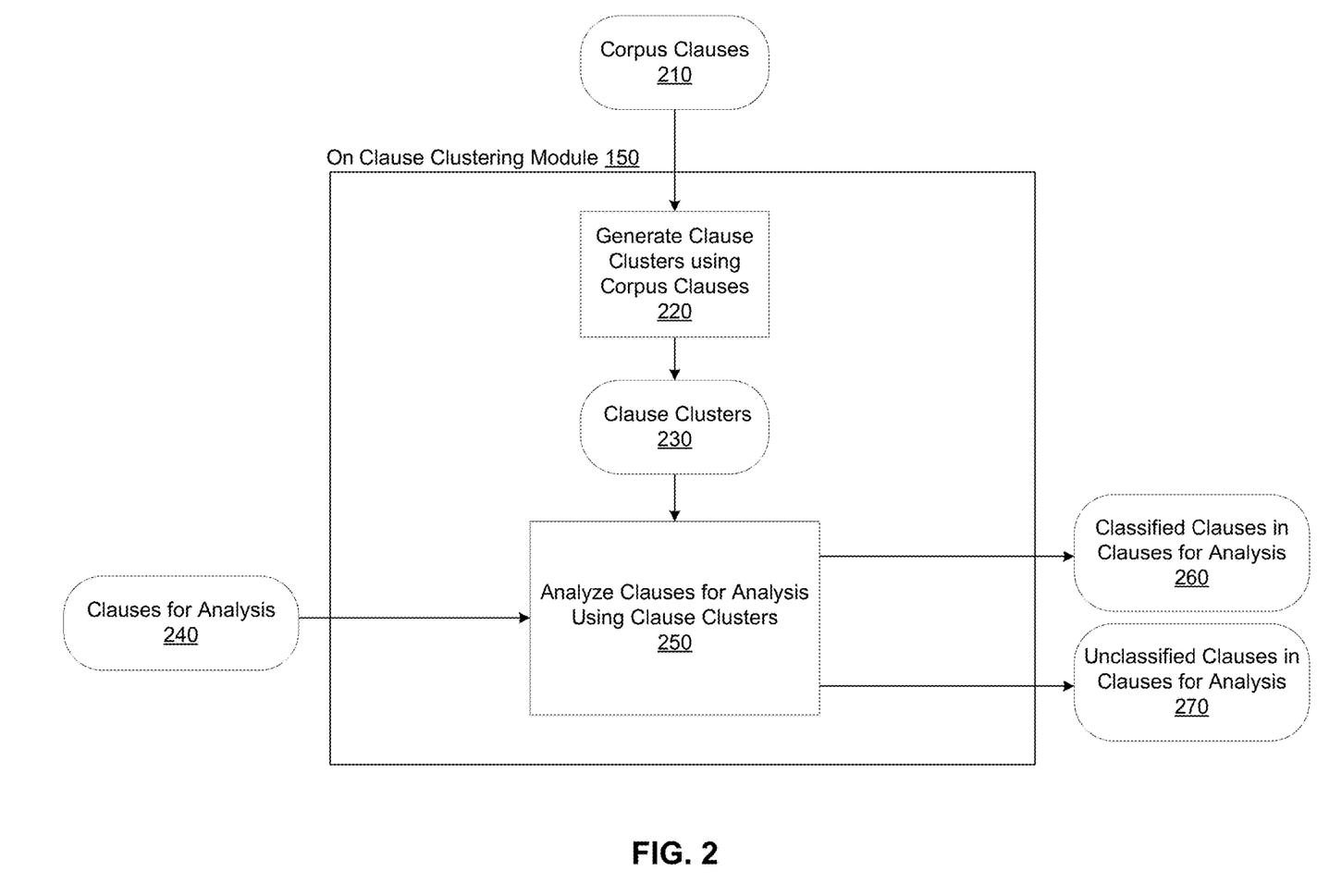
FIG. 2 is a flow diagram illustrating techniques for generating and applying clause clusters by the document clause clustering module of FIG. 1, according to some embodiments.

FIG. 2 is a flow diagram illustrating an embodiment of techniques for generating and applying clause clusters by the document clause clustering module 150. In the embodiment shown, the clause clustering module 150 receives corpus clauses 210 to use for generating 220 clause clusters 230 and clauses for analysis 240 for comparing with the generated clause clusters 230. The corpus clauses 210 may be derived from a corpus of documents corresponding to one or more client systems (e.g., the document corpus 130). For example, the client device 120 may request that the clause clustering module 150 generates 220 clause clusters using clauses from documents provided by the client device 120. Similarly, the clauses for analysis 240 are derived from the set of documents for analysis 110. A user of the document management system 140 may manually input or curate a subset of the corpus clauses 210 or the clauses for analysis 240. In some embodiments, the corpus clauses 210 or the clauses for analysis 240 are extracted from corresponding documents by being manually flagged, for instance by a document creator, while in other embodiments, the clauses are identified automatically, for instance based on a header associated with the clause, based on a signature or initials field associated with the clause, or based on any other characteristic associated with the clause. It should be noted that the information included in the corpus clauses 210 may be representative of clauses from historical documents stored by the document management system 140 or otherwise associated with the system environment 100.

In order to generate 220 the clause clusters 230 using the corpus clauses, the clause clustering module 150 may identify template clauses within the corpus clauses 210, as described above with reference to FIG. 1. In this case, the clause clustering module 220 compares other clauses in the corpus clauses 210 to the identified template clauses in order to determine similarity measures between the other clauses and the template clauses. The clause clustering module 150 clusters clauses from the corpus clauses 210 with template clauses having a similarity measure over a threshold similarity. In some cases, the clause clustering module 150 automatically assigns classifications to clause clusters within the clause clusters 230. For example, the clause clustering module 150 may classify a template clause corresponding to a clause cluster using various techniques, such as natural language processing. As another example, the clause clustering module 150 may use information associated with the corpus clauses 220 to assign classifications to cluster clauses, such as metadata including user-provided clause classifications. In the same or difference cases, the clause clustering module 150 may assign classifications to clause clusters according to user input, such as user input received via user interfaces provided by document review module 160 including information describing the clause clusters 230.

After generating the clause clusters 230, clause clustering module 150 analyzes 250 the clauses for analysis 240 using the clause clusters 230. In particular, clause clustering module 150 may use the same techniques used to generate 220 the clause clusters 230 to compare the clauses for analysis 240 to the clause clusters 230. For example, the clause clustering module 150 may determine measures of similarity between each of the clauses for analysis 240 and one or more template clauses associated with the clause clusters 230. If the clause clustering module 150 determines that a measure of similarity between a clause in the clauses for analysis 240 and aa clause cluster of the clause clusters 230 exceeds a similarity threshold, the clause clustering module assigns the clause to the cluster. The clause clustering module 150 may further classify the clause assigned to the cluster using a classification associated with the cluster, as described above.

Based on analyzing 250 the clauses for analysis, the clause clustering module 150 determines classified clauses 260 in the clauses for analysis 240 and unclassified clauses 270 in the clauses for analysis 240. The classified clauses 260 are clauses in the clauses for analysis 240 that the clause clustering module 150 classified based on the analyzing 250. For example, the classified clauses may be clauses that the clause clustering module 150 successfully clustered with one or more clause clusters of the clause clusters 230 associated with a classification. As another example, the classified clauses 260 may be clauses that the clause clustering module 150 assigned to a primary stack of a clause cluster, as described above with reference to FIG. 1. Conversely, the unclassified clauses 270 are clauses that the clause clustering module 150 did not classify based on the analyzing 250. The unclassified clauses 270 may be clauses that the clause clustering module 150 did not successfully cluster with one or more clause clusters of the clause clusters 230 associated with a classification. In this case, the unclassified clauses 270 may include clauses that the clause clustering module 150 successfully clustered with clause clusters of the clause clusters 230 that are not associated with a classification. Similarly, the unclassified clauses 270 may include clauses that the clause clustering module 150 assigned to one or more secondary stacks of a clause cluster of the clause clusters 230, as described above with reference to FIG. 1. Additionally, the unclassified clauses 260 may include one or more new clause clusters including clauses from the clauses for analysis 240 that were not included in the clause clusters 230. As described in greater detail below with reference to FIG. 4, the document management system 140 may provide the unclassified clauses 270 for user review in order to receive classifications for the unclassified clauses 270.

Clause clustering module 150 may also receive or otherwise obtain information about documents from which the corpus clauses 210 or clauses for analysis 240 originate, and the clause clustering module 150 may use this information to generate 220 clause clusters or analyze 250 the clauses for analysis 240. Examples of this information may include, for each document: a type or classification of the document, size of the document, languages within the document, region in which the document originated, characteristics associated with the sending and receiving party of the document (e.g., size, industry, location of headquarters, revenue, corporate structure), types or categories of information or passages within the document, and the like. In the same or different embodiments, the clause clustering module 150 may receive or otherwise obtain additional information about documents (e.g., document lifecycle data) associated with a system, customer or organization of the system environment 100.

Example Clause Review Interfaces

FIG. 3 illustrates an embodiment of a search interface 300 of a document analytics dashboard for reviewing document clause clusters. In the embodiment shown, the search interface 300 includes a search criteria pane 310, a clause clusters pane 320, a cluster documents pane 330, and a clause preview pane 340. The document analytics dashboard may be provided for display on client devices (e.g., the client device 120) by the document review module 160, as described above with reference to FIG. 1. Overall, the search interface 300 facilitates searching for document clauses that meet certain criteria using clause clusters determined by the document management system 140. The search criteria pane 310 displays fields for receiving user input to configure search criteria for documents or clauses. The clause clusters pane 320 displays results of a search performed by the document management system 140 based on search criteria input to the search criteria pane 310. In particular, the clause clusters pane 320 includes a list of clause clusters identified by a classification (e.g., "limitation of liability clause A," "limitation of liability clause B," "indemnification clause A," etc.) or "unclassified" if no classification exists (e.g., "unclassified clause A" and "unclassified clause B"). The cluster documents pane 330 displays a list of documents that include a clause cluster selected in the clause clusters pane 320, as indicated by the grey highlight. Similarly, the clause preview pane 340 displays the actual text of a clause in a document selected in the cluster documents pane 330. The document pane further has a interactive button to modify the clause cluster displayed in the cluster documents pane 330, such as to add or remove document clauses to the cluster, generate a new cluster, or provide a new or updated classification for the cluster, such as described in greater detail below with reference to FIG. 4.

FIG. 4 illustrates an embodiment of a review interface 400 of a document analytics dashboard for providing a classification for a clause cluster. In the embodiment shown, the review interface 400 includes a cluster documents pane 410, review controls 420, a select clause pane 430, and a cluster template clause pane 440. The document analytics dashboard may be the same as the document analytics dashboard in FIG. 3. In this case, the "unclassified clause cluster A" may correspond to the "unclassified clause A" in the search interface 300. Additionally, or alternatively, the review interface 400 may be accessed from the search interface 300 by interacting with the "modify" button under the clause documents pane 330.

As with FIG. 3, the document analytics dashboard depicted in FIG. 4 may be provided for display on client devices (e.g., the client device 120) by the document review module 160, as described above with reference to FIG. 1. Overall, the review interface 400 facilitates user review of a cluster of document clauses, and in particular an "unclassified clause cluster A" as depicted in FIG. 4. Although the "unclassified clause cluster A" is displayed in the cluster documents pane in FIG. 4, this is done for the purpose of illustration only and any suitable clause cluster may be selected. The review controls 420 provide various user controls, including for navigating to other clause clusters (e.g., using "previous" or "next"), approving a cluster (e.g., using "approve cluster"), providing a classification for the cluster, rejecting the cluster, or modifying the cluster. The particular review controls 420 are provided for the purpose of illustration only, and other embodiments may include fewer, additional, or different controls.

The selected clause pane 430 displays the text of a clause selected in the cluster documents pane 410, as indicated by the grey highlight. Conversely, the cluster template clause pane 440 displays a template clause corresponding to the unclassified clause cluster A. The template clause may be included in the unclassified clause cluster A and may be identified using various techniques, as described above with reference to the clause clustering module 150. In cases where multiple template clauses are associated with the selected clause cluster the review interface 400 may enable review or display of multiple template clauses, e.g., via the cluster template clause pane.

Among other advantages, the review interface 400 enables a user of the document management system 140 to provide input directed at sets of multiple clauses (e.g., clause clusters) through review of individual clauses in the cluster, such as to classify an entire cluster of clauses based on review of individual clauses in the cluster. This review technique provides document clause review process improves clause review efficiency and accuracy relative to conventional techniques.

Process for Reviewing Document Clauses

Figure 5:
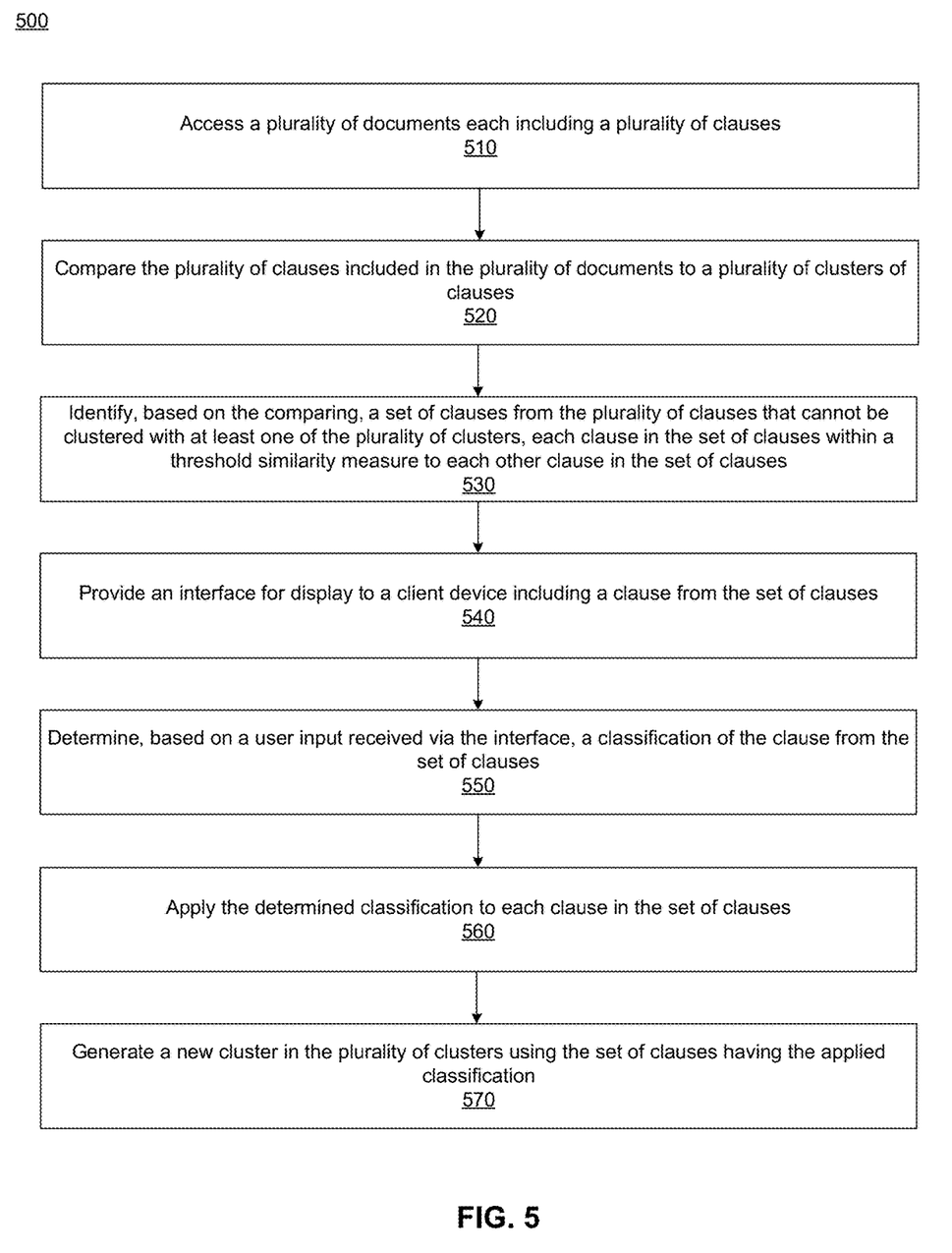
FIG. 5 illustrates a process for classifying document clauses, according to some embodiments.

FIG. 5 illustrates an example process 500 for classifying document clauses, in accordance with one or more embodiments. In the embodiment shown in FIG. 5, the process 500 is performed by the document management system 140. In other embodiments, some or all of the steps of the process 500 may be performed by other components of the system environment 100, or may be performed in a different order than that depicted in FIG. 5. Additionally, in other embodiments, the process 500 illustrated in FIG. 5 can include fewer, additional, or different steps than those described herein.

The process 500 includes the document management system 140 accessing a plurality of documents each including a plurality of clauses. For example, the document management system 140 may receive or otherwise access a set of documents selected for analysis by a client system of the document management system 140, such the set of documents for analysis 110 provided by client device 120.

The process 500 includes the document management system 140 comparing 520 the plurality of clauses included in the plurality of documents to a plurality of clusters of clauses. For example, the document management system 140 may compare the plurality of clauses to clause clusters determined from a corpus of documents, such as the document corpus 130. In particular, the document management system 140 may compare the plurality of clauses to one or more template clauses associated with the plurality of clusters of clauses, as described above with reference to FIG. 2.

The process 500 includes the document management system 140 identifying 530, based on the comparing 520, a set of clauses from the plurality of clauses that cannot be clustered with at least one of the plurality of clusters, each clause in the set of clauses within a threshold similarity measure to each other clause in the set of clauses. For instance, similarity measures (e.g., a similarity score) for the set of clauses and the plurality of clusters may be below the threshold similarity measure. In some embodiments, the identifying 530 includes accounting for terms of contextual significance included in the plurality of clauses in determining similarity measures for the plurality of clauses, as described above with reference to the clause clustering module 150. In such cases, the document management system 140 may determine that a similarity measure for a clause is below a threshold similarity measure of at least one of the set of clauses based at least in part on a term of contextual significance included in the clause. As a result of the similarity measure being below the threshold similarity measure, the document management system 140 may exclude the clause from the set of clauses. Similarly, the document management system 140 may determine that a similarity measure for a clause is at or above a threshold similarity measure of at least one of the set of clauses based at least in part on a term of contextual significance included in the clause. In this case, as a result of the similarity measure being at or above the threshold similarity measure, the document management system 140 may include the clause in the set of clauses The process 500 includes the document management system 140 providing 540 an interface for display to a client device including a clause from the set of clauses. For example, the document management system 140 may provide the interface 400 for display to the client device 120, as described above with reference to FIG. 4. In this case, the clause from the set of clauses may be a template clause identified for the set of clauses or may be another clause displayed in comparison to a template clause for the set of clauses, e.g., as depicted in the review interface 400.

The process 500 includes the document management system 140 determining 550, based on a user input received via the interface, a classification of the clause from the set of clauses. For instance, a user of the client device 120 may provide a classification for the clause using the interface 400, as described above. As another example, the user of the client device 120 may provide approval of a classification determined by document management system 140 or otherwise obtained for the clause.

The process 500 includes the document management system 140 applying 560 the determined classification to each clause in the set of clauses. For instance, the document management system 140 may use the classification as an overall classification of the set of clauses.

The process 500 includes the document management system 140 generating 570 a new cluster in the plurality of clusters using the set of clauses having the applied classification. For example, the document management system 140 may store the set of clauses as a clause cluster in the plurality of clusters.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
accessing, using at least one processing circuitry, a plurality of documents each including a plurality of clauses, the accessing including
   determining one or more relationships between one or more documents in the plurality of documents and one or more clauses of the plurality of documents using one or more training documents to generate one or more related documents, the one or more related documents including document information; and
   generating, using the document information of the one or more related documents, a plurality of clusters of clauses, the plurality of clauses being indicative of one or more relationships between at least one of the plurality of documents and the one or more clauses;
comparing, using the at least one processing circuitry, the plurality of clauses included in the plurality of documents to the plurality of clusters of clauses, each cluster of clauses including clauses having a shared classification;
identifying, using the at least one processing circuitry, based on the comparing of the plurality of clauses to the plurality of clusters of clauses, a set of clauses from the plurality of clauses that cannot be clustered with any of the plurality of clusters, each clause in the set of clauses being within a threshold similarity measure to each other clause in the set of clauses, wherein identifying the set of clauses includes:
   determining, using the at least one processing circuitry, an initial similarity measure for a clause of the plurality of clauses that is within the threshold similarity measure to each other clause in the set of clauses, wherein the initial similarity measure is determined without considering terms of contextual significance, the terms of contextual significance alter a meaning of at least a portion of the clause;
   determining, using the at least one processing circuitry, for the clause whose initial similarity measure is determined to be within the threshold similarity measure, a final similarity measure that accounts for the terms of contextual significance by utilizing a machine learned similarity measure model that receives as input clause features describing the terms of contextual significance; and
   in response to determining that the final similarity measure for the clause is not within the threshold similarity measure, excluding, using the at least one processing circuitry, the clause from the set of clauses;
providing, using the at least one processing circuitry, an interface for display to a client device including a clause from the set of clauses;
determining, using the at least one processing circuitry, based on a user input received via the interface, a classification of the clause from the set of clauses;

applying, using the at least one processing circuitry, the determined classification to each clause in the set of clauses; and generating, using the at least one processing circuitry, a new cluster in the plurality of clusters using the set of clauses having the applied classification.

2. The method of claim 1, further comprising:
generating the plurality of clusters of clauses by:
receiving a plurality of training documents;
extracting a plurality of training clauses from the plurality of training documents;
determining similarity measures between pairs of the plurality of training clauses; and
determining the plurality of clusters of clauses based on the determined similarity measures between pairs of the plurality of training clauses.

3. The method of claim 2, further comprising:
after the plurality of clusters of clauses is generated, identifying an unclassified cluster of the plurality of clusters of clauses;
identifying a template clause corresponding to the unclassified cluster; and
assigning a classification to the unclassified cluster using the template clause.

4. The method of claim 1, wherein identifying the set of clauses from the plurality of clauses comprises:
identifying a template clause that is not clustered with any of the plurality of clusters;
comparing an additional clause from the plurality of clauses that cannot be clustered with any of the plurality of clusters to the template clause;
determining, based on the comparing of the additional clause to the template clause, a similarity measure between the template clause and the additional clause; and
responsive to the similarity measure between the template clause and the additional clause being within a similarity measure threshold, adding the additional clause to the set of clauses.

5. The method of claim 4, wherein the interface includes the template clause, and wherein determining the classification of the clause from the set of clauses comprises:
receiving user input via the interface indicating a classification for the template clause.

6. The method of claim 5, wherein the interface includes the additional clause, and wherein determining the classification of the clause from the set of clauses comprises:
receiving user input via the interface indicating an approval to cluster the additional clause with the template clause.

7. The method of claim 1, wherein a cluster of the plurality of clusters includes a primary stack of clauses and a secondary stack of clauses, and further comprising:
based on the comparing of the plurality of clauses to the plurality of clusters of clauses:
identifying a first set of clauses matching the primary stack of clauses; and
identifying a second set of clauses matching the secondary stack of clauses;
responsive to identifying the first set of clauses, assigning the shared classification of the cluster to the first set of clauses; and
responsive to identifying the second set of clauses, providing an additional interface for display to the client device including a request for approval to assign the shared classification of the cluster to the second set of clauses.

8. The method of claim 7, wherein the primary stack of clauses includes clauses that are exact matches and the secondary stack of clauses includes clauses within a threshold similarity measure of the clauses in the primary stack of clauses.

9. The method of claim 1, further comprising:
for a document of the plurality of documents:
comparing one or more clauses of the document to one or more clauses of a template document; and
determining, based on the comparing of the one or more clauses of the document to the one or more clauses of the template document, a measure of commonality indicative of a degree to which the one or more clauses of the document match the one or more clauses of the template document.

10. The method of claim 9, wherein determining the measure of commonality comprises:
determining one or more similarity measures based on the comparing of the one or more clauses of the document to the one or more clauses of the template document; and
computing the measure of commonality using the one or more similarity measures, the measure of commonality indicative of a percentage of the one or more similarity measures that are within an additional threshold similarity measure.

11. The method of claim 1, wherein a similarity measure of the clause of the set of clauses is determined by:
performing one or more similarity analyses on the clause of the set of clauses and a template clause; and
calculating the similarity measure using results of the one or more similarity analyses.

12. The method of claim 11, wherein the one or more similarity analyses include term frequency-inverse document frequency (TF-IDF), text near duplication, conceptual clustering, conceptual searching, or text redlining.

13. The method of claim 1, further comprising:
determining, based on the comparing of the plurality of clauses to the plurality of clusters of clauses, one or more recommended template documents for the plurality of documents; and
providing the one or more recommended template documents to the client device.

14. A system comprising at least one processing circuitry and a non-transitory computer-readable storage medium storing instructions that, when executed by the at least one processing circuitry, cause the at least one processing circuitry to:
access a plurality of documents each including a plurality of clauses, accessing the plurality of documents includes
determining one or more relationships between one or more documents in the plurality of documents and one or more clauses of the plurality of documents using one or more training documents to generate one or more related documents, the one or more related documents including document information; and
generating, using the document information of the one or more related documents, a plurality of clusters of clauses, the plurality of clauses being indicative of one or more relationships between at least one of the plurality of documents and the one or more clauses;
compare the plurality of clauses included in the plurality of documents to the plurality of clusters of clauses, each cluster of clauses including clauses having a shared classification;

identify, based on comparing of the plurality of clauses to the plurality of clusters of clauses, a set of clauses from the plurality of clauses that cannot be clustered with any of the plurality of clusters, each clause in the set of clauses being within a threshold similarity measure to each other clause in the set of clauses wherein identifying the set of clauses includes:
  determining an initial similarity measure for a clause of the plurality of clauses that is within the threshold similarity measure to each other clause in the set of clauses, wherein the initial similarity measure is determined without considering terms of contextual significance, the terms of contextual significance alter a meaning of at least a portion of the clause;
  determining, for the clause whose initial similarity measure is determined to be within the threshold similarity measure, a final similarity measure that accounts for the terms of contextual significance by utilizing a machine learned similarity measure model that receives as input clause features describing the terms of contextual significance; and
  in response to determining that the final similarity measure for the clause is not within the threshold similarity measure, excluding the clause from the set of clauses;
provide an interface for display to a client device including a clause from the set of clauses;
determine, based on a user input received via the interface, a classification of the clause from the set of clauses;
apply the determined classification to each clause in the set of clauses; and
generate a new cluster in the plurality of clusters using the set of clauses having the applied classification.

15. The system of claim 14, wherein the instructions further cause the at least one processing circuitry to:
  generate the plurality of clusters of clauses by:
    receiving a plurality of training documents;
    extracting a plurality of training clauses from the plurality of training documents;
    determining similarity measures between pairs of the plurality of training clauses; and
    determining the plurality of clusters of clauses based on the determined similarity measures between pairs of the plurality of training clauses.

16. The system of claim 15, wherein the instructions further cause the at least one processing circuitry to:
  after the plurality of clusters of clauses is generated, identify an unclassified cluster of the plurality of clusters of clauses;
  identify a template clause corresponding to the unclassified cluster; and
  assign a classification to the unclassified cluster using the template clause.

17. The system of claim 14, wherein identifying the set of clauses from the plurality of clauses comprises:
  identifying a template clause that is not clustered with any of the plurality of clusters;
  comparing an additional clause from the plurality of clauses that cannot be clustered with any of the plurality of clusters to the template clause;
  determining, based on the comparing of the additional clause to the template clause, a similarity measure between the template clause and the additional clause; and
  responsive to the similarity measure between the template clause and the additional clause being within a similarity measure threshold, adding the additional clause to the set of clauses.

18. The system of claim 17, wherein the interface includes the template clause, and wherein determining the classification of the clause from the set of clauses comprises:
  receiving user input via the interface indicating a classification for the template clause.

* * * * *